United States Patent
Fiore

[11] 3,945,252
[45] Mar. 23, 1976

[54] FLUID FLOW MEASURING APPARATUS
[76] Inventor: William Victor Fiore, 28 Seaview Harbor, Longport, N.J. 08403
[22] Filed: Jan. 30, 1975
[21] Appl. No.: 545,566

[52] U.S. Cl. ................................................. 73/204
[51] Int. Cl.[2] ........................................ G01F 1/68
[58] Field of Search ................... 73/204; 338/9, 28

[56] References Cited
UNITED STATES PATENTS

| | | | |
|---|---|---|---|
| 2,412,471 | 12/1946 | Olson | 73/204 |
| 2,669,872 | 2/1954 | Hartweg | 73/204 X |
| 2,888,655 | 5/1959 | Lawler | 338/28 |
| 3,677,085 | 7/1972 | Hayakawa | 73/204 |

FOREIGN PATENTS OR APPLICATIONS

| | | | |
|---|---|---|---|
| 651,152 | 3/1951 | United Kingdom | 73/204 |

Primary Examiner—Herbert Goldstein
Attorney, Agent, or Firm—David A. Tamburro

[57] ABSTRACT

Apparatus for measuring the rate of fluid flow through a conduit including a flow rate sensor assembly connected to suitable electrical circuitry and indicating instrumentation. The sensor assembly includes a heated wound resistive element which senses fluid flow rate and a fluid temperature compensating wound resistive element, both elements being mounted on a common spherically shaped surface which is exposed to the flow media.

8 Claims, 5 Drawing Figures

FLUID FLOW MEASURING APPARATUS

BACKGROUND OF THE INVENTION

This invention relates generally to apparatus for measuring rate of fluid flow and more particularly to a novel sensor assembly which is very sensitive to changes in flow rates and which automatically compensates for temperature variations in the flow media.

In the past, fluid flow rates have been measured by various type mechanical flow meters such as turbine meters, vane type meters, venturi meters, etc. Electrical flow measuring systems have also been posposed, as typified by U.S. Pat. Nos. 3,199,348; 3,335,606; 3,645,133; and 3,800,592. However, such prior known apparati have not been entirely satisfactory and in many applications have lacked the sensitivity required for accurate flow measurement.

SUMMARY OF THE INVENTION

Accordingly, the primary object of the invention resides in the provision of novel, highly sensitive fluid flow measuring apparatus capable of accurately measuring flow rates.

Another object of the invention resides in the provision of novel fluid flow measuring apparatus including a unique flow rate sensor assembly connected to electrical control circuitry such as a Wheatstone bridge and suitable indicating instrumentation. The sensor assembly comprises a first heated wound resistive flow sensing element and a second fluid ambient temperature compensating wound resistive element, both of which are mounted on a common convex, spherically shaped surface that is directly exposed to the flow media. Consequently, acute sensitivity results from exposure of the entire length of the wound elements to the fluid media.

Still another object of the invention resides in the provision of the previously discussed flow rate sensor assembly wherein the wound resistive elements are wound within a spiral groove provided in the spherical mounting surface. As a result, the resistive elements are protected against damage due to foreign particles contained in the measured fluid flowing past.

The sensor assembly of the invention has been found to be especially useful in fire fighting apparatus such as pumper trucks to measure flow rates at each gate. The invention makes it now possible to control pumping rates directly instead of interpreting flow rates from hose size and pressure measurements as in present practice. In addition, water additive injection systems could now be automatically controlled based on flow rate signals.

Other objects and advantages will become readily apparent from reading the following detailed description of a preferred embodiment of the invention wherein reference is made to the accompanying drawings in which like numerals indicate like elements.

DETAILED DESCRIPTION OF THE INVENTION

Figure 1:
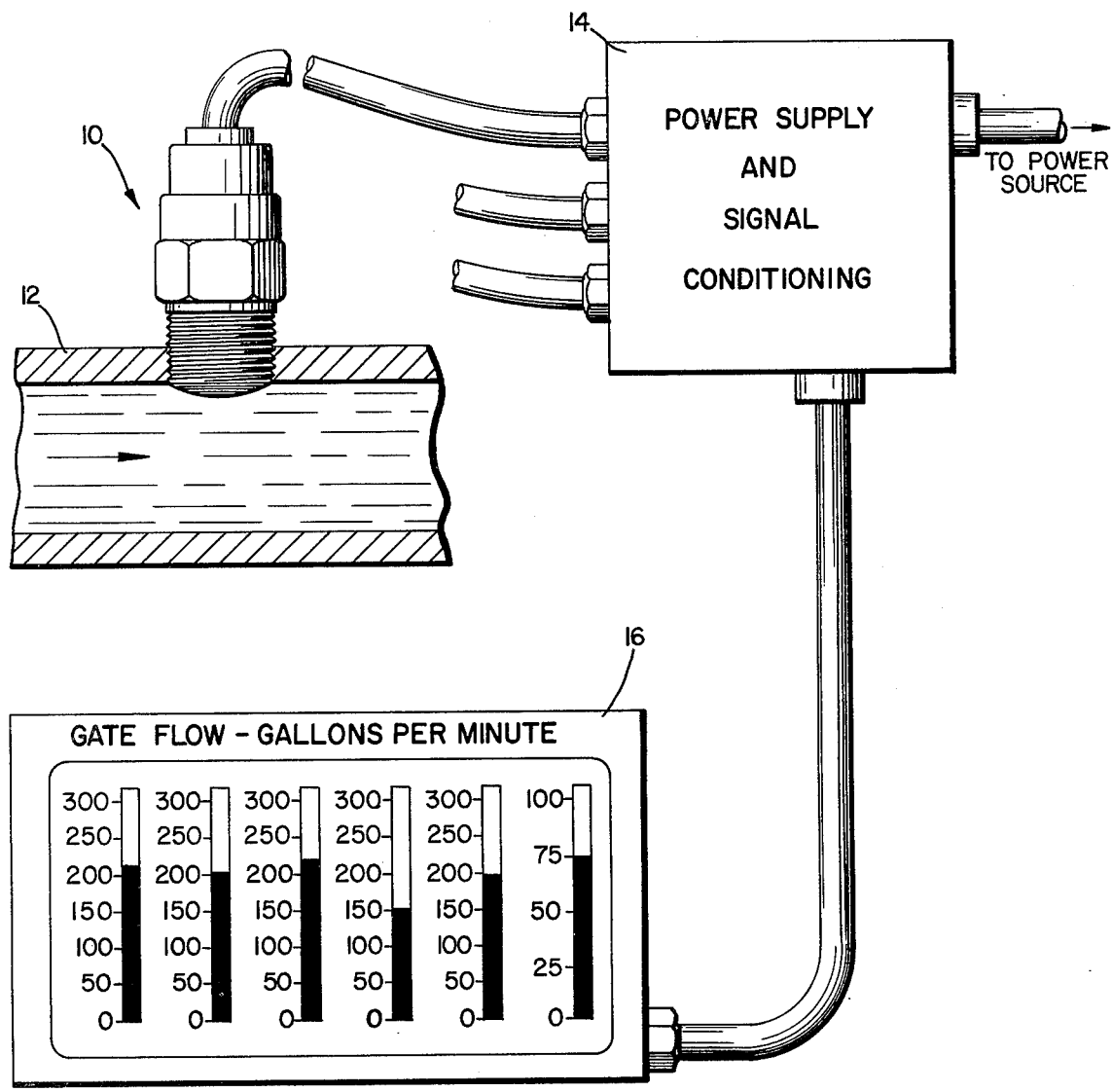
FIG. 1 is a fragmentary schematic illustration of the flow sensing apparatus of the invention.

Referring now to FIG. 1, the flow sensing apparatus of the invention includes a flow rate sensor assembly 10 threaded into a water conduit 12 and electrically connected to suitable power supply and signal conditioning equipment 14 capable of receiving signals from a plurality of sensor assemblies 10. The output control signal from equipment 14 could then be fed to indicating apparatus 16 which in a fire pumping truck would indicate gallons per minute for a number of pumping gates. Alternatively, in systems where additives are injected into the water, the control signal could operate suitable control valuing so that the amount of additive mixed into the water is accurately regulated automatically.

Figure 4:
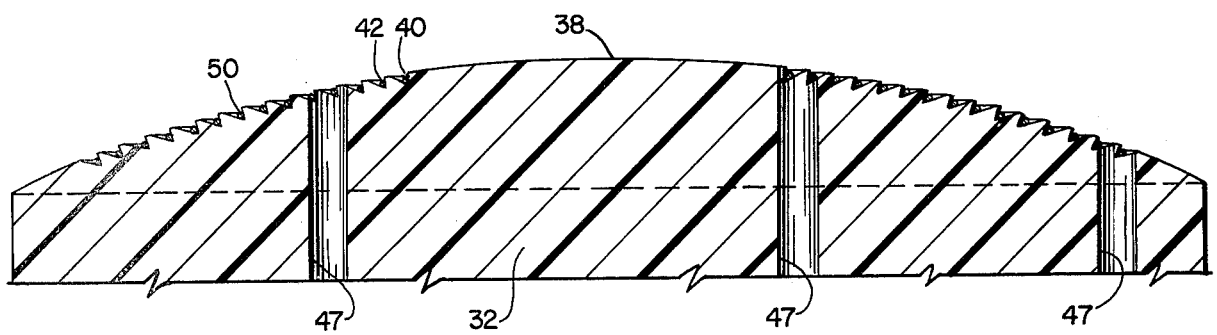
FIG. 4 is a fragmentary sectional view taken along line 4—4 of FIG. 3.
Figure 2:
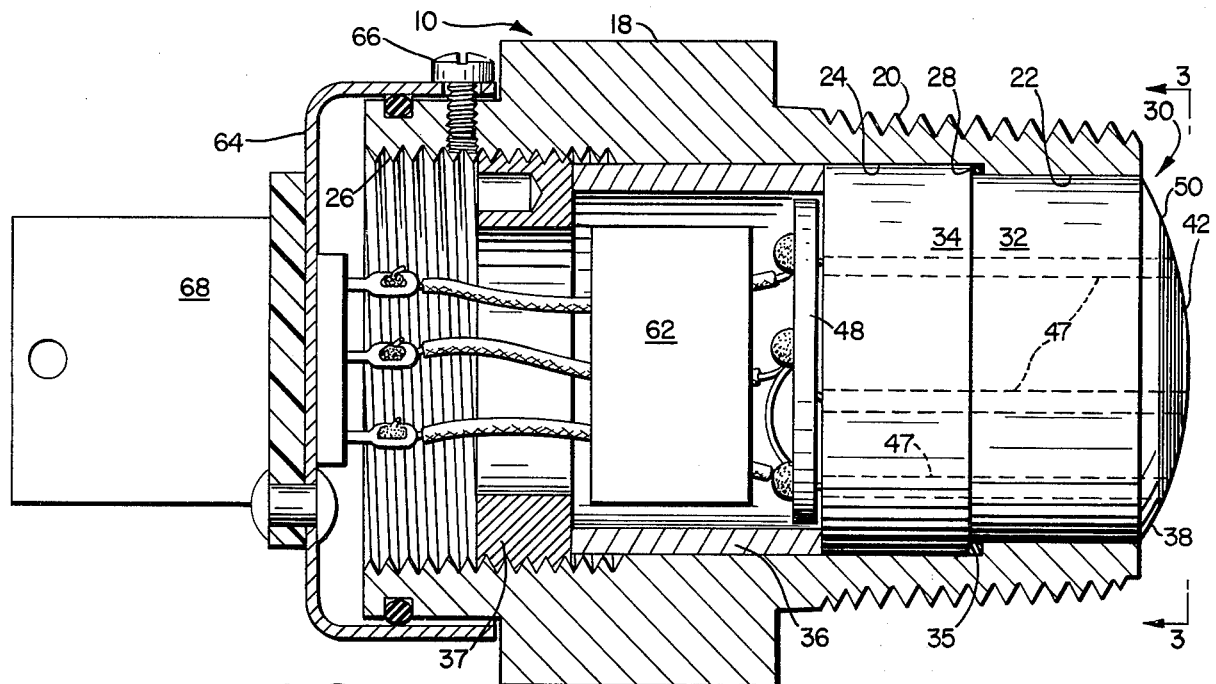
FIG. 2 is a fragmented sectional view of the novel flow sensor assembly of the invention.
Figure 3:
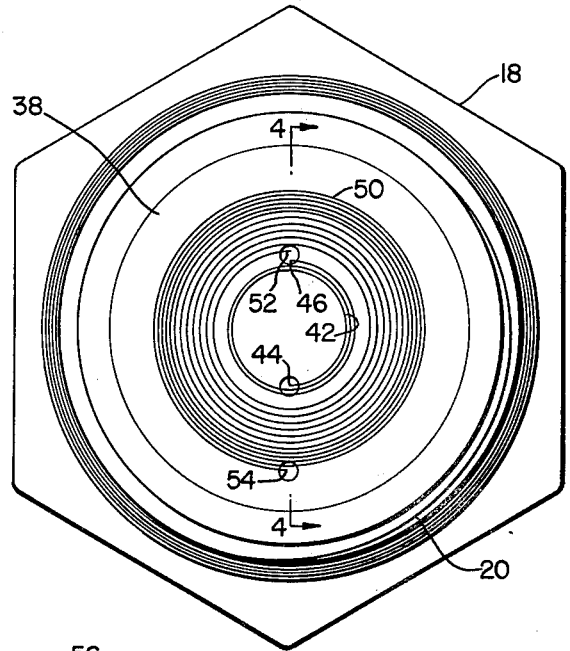
FIG. 3 is an end view of the sensor assembly taken along line 3—3 of FIG. 2, illustrating the sensor elements wound on the spherical mounting surface.

As shown specifically in FIGS. 2–4, sensor assembly 10 (shown at about 2 ½ times actual size) includes a housing 18 formed from hexagonal brass stock and having a forward threaded section 20 adapted to be threaded directly into the side wall of conduit 12, which in a pumper truck is about 2–3 inches diameter. Housing 18 is axially bored to provide a forward bored section 22 concentric with an enlarged counter-bored section 24, the rearward end 26 of which is threaded. A shoulder 28 is located at the junction of bored sections 22 and 24.

A sensor mounting insert 30 constructed of suitable electrical insulating material such as nylon is mounted within housing 18 and includes a front cylindrical section 32 slidable through bore section 22 and a larger rear cylindrical section 34 slidable in bore section 24. An O-ring sealing member 35 engages between section 34 and shoulder 28, when insert 30 is locked within the housing by spacer ring 36 and lock ring 37 which threads into section 26.

The front face of section 32 is formed to provide a convex spherically shaped surface 38 which extends into conduit 12 in direct exposure to the water flowing there through. A spiral groove 40 is cut into surface 38 and extends from a point adjacent the center of the surface to a point adjacent its outer edge.

A first flow sensing resistive winding 42 is wound within the inner spiral turns of groove 40 which are nearest the center of surface 38. Winding 42 has its ends 44 and 46 extending rearwardly through axial passages 47 in insert 30 to a terminal board 48 mounted on the rear of insert 30. A second ambient fluid temperature compensating resistive winding 50 is wound within the outer turns of groove 40 with its ends 52 and 54 also extending through insert 30 to terminal block 48. A space of approximately one turn in groove 40 is left between end 46 of winding 42 and end 52 of winding 50. Placing flow sensing winding 42 at the center portion of surface 38 situates it further into the measured fluid than winding 50, and thus makes it more sensitive to flow changes. In addition, positioning both windings within groove 40 protects them against damage which might be caused by foreign particles contained in the fluid flowing past.

Both windings 42 and 50 are fine high resistivity wire, approximately .005 inch in diameter, having a relatively high temperature coefficient of resistance. Materials such as pure nickel or the various nickel iron alloys have been found suitable.

Preferably, the comparative lengths of windings 42 and 50 are such that the flow sensing winding 42 is substantially shorter than temperature compensating winding 50, e.g. winding 42 is about one tenth as long as winding 50. The relative initial electrical resistances and sensitivity of the windings vary directly with the length and size of wire used, and may be varied to provide the most suitable values for a particular design.

Figure 5:
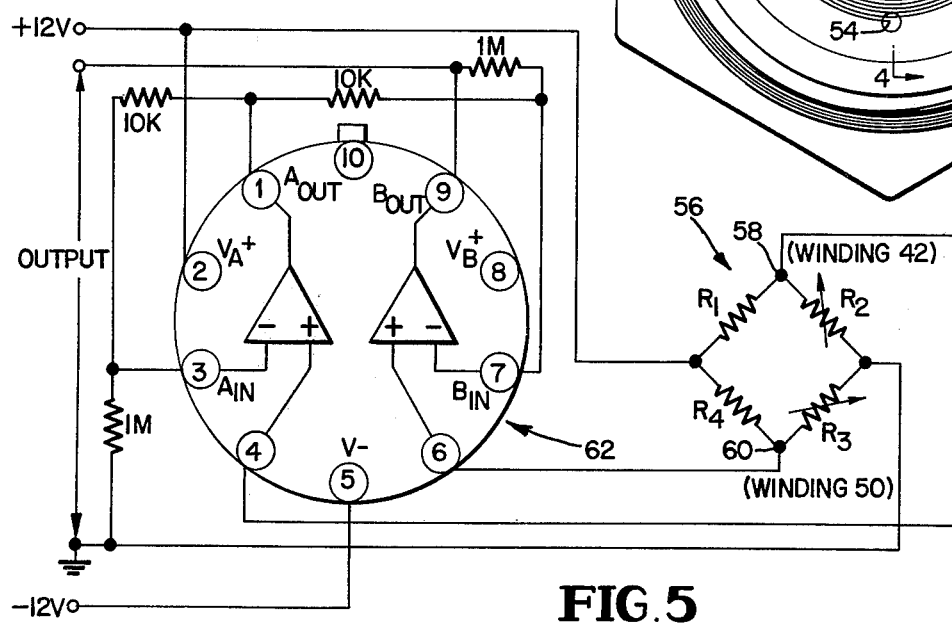
FIG. 5 is a schematic illustration of typical electrical circuitry which may be used in the invention.

As shown in FIG. 5, flow sensing winding 42 (R2) and temperature compensating winding (R3) are connected in a Wheatstone bridge circuit 56 on circuit board 48 with $$\frac{R1}{R2} = \frac{R4}{R3}.$$

R2 is approximately 1 OHM, R3 is approximately 10 OHMS, and R1 and R4 can be varied to establish suitable current levels in R2 and R3 to enable their use at design operating temperatures. Since R4 is large in resistance compared to R1, relatively smaller currents will flow through R4 and R3. R1 will be about one tenth the resistance of R4 so that the current through R1 and R2 will normally be approximately ten times the current through R4 and R3. As a result of this relationship the operating temperature of temperature compensating winding 50 (R3) is normally much less than that of the flow sensing winding 42 (R2).

During operation fluid flow through conduit 12 will have a cooling effect on sensing winding 42 (R2). The resistance of which will thus vary with the rate of flow. In the circuitry of FIG. 5 with a constant bridge excitation voltage, the bridge output from terminals 58 and 60 will vary with R2. The bridge output signal may then be amplified by operational amplifier 62 for use in instrumentation such as the control equipment of FIG. 1.

An alternative mode of electrical operation would be to use a high gain differential amplifier (not shown) to vary the bridge excitation voltage so that the bridge is continuously balanced. In effect, this will maintain winding 42 (R2) at a constant temperature as the flow rate varies. The control signal output from the differential amplifier will thus be proportional to the bridge excitation voltage necessary to keep the bridge balanced.

As shown in FIG. 2, the amplifier circuitry may be conveniently housed within rings 36 and 37 and protected therein by a rear cover plate 64 retained on the rear of housing 18 by screws 66. An electrical connector 68 fastened on cover 64 provides the electrical connections to and from the amplifier and bridge 56.

The flow sensor assembly of the invention described hereinabove provides many advantages over known prior art devices. Both the flow rate sensing winding 42 and the fluid temperature compensating winding 50 are wound on the common convex spherical surface 38. The lengths of the windings afford substantial sensor surface area exposed to and in intimate contact with the fluid being measured, thus providing maximum sensitivity to changes in flow rate and continuous instantaneous ambient temperature compensation.

Locating windings 42 and 50 in spiral groove 40 protects them against damage from foreign particles in the fluid, and thus enhances operational reliability and promotes longer service life. Also, locating the flow rate sensing winding 42 closer to the center of surface 38 ensures that this winding extends farther into the fluid flow in direct contact therewith. The comparative lengths of windings 42 and 50 ensursess that the resistance winding 42 is more quickly affected by changes in flow rates, thus providing desirable instantaneous response, while winding 50 affords a fluid temperature compensating factor to the bridge circuit output signal.

The overall construction of the sensor assembly is relatively simple and compact, but yet rugged to withstand severe operating conditions, e.g. fluid pressures of 600 psi in conduit 12.

The output signal produced by bridge circuit 56 may be used for various purposes, e.g. merely to actuate flow indicators as in FIG. 1, or to control suitable valves for additive systems, or to actuate a control switch when a predetermined fluid flow is attained.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. Flow sensing apparatus comprising support means adapted to be mounted on a fluid conduit and having a convex spherically shaped support surface exposed to the fluid in said conduit, a first resistive element spirally wound on the central section of said surface for sensing the flow rate of the fluid, a second resistive element spirally wound on the outer section of said surface for compensating for ambient temperature conditions of the fluid, both of said elements being directly exposed to the fluid, and electrical circuit means for producing an output control signal in response to the resistive condition of said elements.

2. The flow sensing apparatus defined in claim 1, wherein said surface has a spiral groove formed therein and said elements are wound in said groove.

3. The flow sensing apparatus defined in claim 1, wherein the electrical resistance of said second element is substantially larger than the resistance of said first element.

4. The flow sensing apparatus defined in claim 3, said circuit means including a Wheatstone bridge, two legs of which are formed by said first and second elements.

5. Flow sensing apparatus comprising support means adapted to be mounted on a fluid conduit and having a substantially spherical convex surface exposed to the fluid in the circuit, said surface having a spiral groove formed therein, electrical sensing means including a first resistive flow rate sensing winding wound in the inner turns of said groove adjacent the center portion of said surface, and a second resistive fluid temeperature compensating winding wound in the outer turns of said groove, said windings being directly exposed to the fluid in said conduit.

6. Flow sensing apparatus as defined in claim 5, wherein the electrical resistance of said first winding is substantially less than the resistance of said second winding, and wherein said sensing means includes a Wheatstone bridge circuit two legs of which are formed by said windings.

7. Flow sensing apparatus as defined in claim 5, said support means comprising a housing adapted to be connected into a circuit, electrical insulator means mounted within said housing and having one end shaped to provide said spherical convex surface, and electric circuit means mounted within said housing for producing a control signal in response to said windings.

8. Flow sensing apparatus as defined in claim 7, wherein the electrical resistance of said first winding is substantially less than the resistance of said second winding, said circuit means including a Wheatstone bridge circuit two legs of which are formed by said windings.

* * * * *